US010990607B1

(12) United States Patent
Altman et al.

(10) Patent No.: US 10,990,607 B1
(45) Date of Patent: Apr. 27, 2021

(54) SYSTEMS AND METHODS FOR LOG AGGREGATION

(71) Applicants: Noah Eyal Altman, Hod Hasharon (IL); Liron Hayman, Hod HaSharon (IL); Tzvika Barenholz, Hod HaSharon (IL); Noa Haas, Hod HaSharon (IL)

(72) Inventors: Noah Eyal Altman, Hod Hasharon (IL); Liron Hayman, Hod HaSharon (IL); Tzvika Barenholz, Hod HaSharon (IL); Noa Haas, Hod HaSharon (IL)

(73) Assignee: Intuit Inc., Mountain View, CA (US)

( * ) Notice: Subject to any disclaimer, the term of this patent is extended or adjusted under 35 U.S.C. 154(b) by 195 days.

(21) Appl. No.: 16/198,572

(22) Filed: Nov. 21, 2018

(51) Int. Cl.
*G06F 16/00* (2019.01)
*G06F 16/27* (2019.01)
*G06F 16/2455* (2019.01)

(52) U.S. Cl.
CPC ........ *G06F 16/27* (2019.01); *G06F 16/24556* (2019.01)

(58) Field of Classification Search
CPC .............. G06F 16/24573; G06F 16/27; G06F 16/9024; G06F 8/10; G06F 8/24; G06F 8/35; G06F 8/77; G06F 9/5027; G06F 9/5072; G06F 9/54; G06F 16/1837; G06F 16/22; G06F 16/258; G06F 16/903; G06F 16/9536; G06F 19/321; G06F 21/16; G06F 21/577; G06F 2221/034; G06F 9/542; G06F 11/30; G06F 11/3006; G06F 11/3419; G06F 11/3438; G06F 11/3452; G06F 11/3476; G06F 11/3636; G06F 16/213; G06F 16/2365; G06F 16/2379; G06F 16/282; G06F 16/288; G06F 16/334; G06F 16/338; G06F 16/38; G06F 16/951; G06F 2201/86; G06F 9/451; G06F 21/64; G06F 11/3051; G06F 2221/2151; G06F 16/235; G06F 8/71; G06F 16/1734; G06F 16/245; G06F 16/24549; G06F 16/9535; G06F 11/0757; G06F 11/3447; G06F 11/3466; G06F 11/3612; G06F 16/13
See application file for complete search history.

(56) References Cited

U.S. PATENT DOCUMENTS

| | | | | |
|---|---|---|---|---|
| 10,868,674 | B2 * | 12/2020 | Beecham | G06F 21/602 |
| 2018/0102938 | A1 * | 4/2018 | Yoon | G06F 17/40 |
| 2018/0205552 | A1 * | 7/2018 | Struttmann | G06F 16/9024 |
| 2018/0349482 | A1 * | 12/2018 | Oliner | H04L 41/22 |

* cited by examiner

*Primary Examiner* — Shyue Jiunn Hwa
(74) *Attorney, Agent, or Firm* — Ferguson Braswell Fraser Kubasta PC

(57) ABSTRACT

A method that involves receiving a set of first log records. The set of first log records are duplicated using key operation pairs to generate a set of second log records from the set of first log records. The set of second log records are duplicated using a second set of intervals to generate a set of third log records from the set of second log records. The set of third log records are aggregated using the second set of intervals to generate a set of aggregated log records. The set of aggregated log records includes an aggregated log record comprising a number indicating a number of events from the set of first log records that have the key, that have the operation, and that occurred during an interval of the second set of intervals. The operation is identified by comparing the aggregated log record to a server log record.

20 Claims, 10 Drawing Sheets

Table 700

| 702 | 708 Index | 710 IP | 712 Start timestamp | 714 End timestamp | 716 Op_details |
|---|---|---|---|---|---|
| 704 | 1 | 10.87.179.2 | 10:02 | 10:07 | JSON of keys and operations |
| 706 | 2 | 10.57.183.1 | 10:03 | 10:08 | JSON of keys and operations |

*Figure 7*

Table 800

| 802 | 820 Index | 822 IP | 824 Start timestamp | 826 End timestamp | 828 Key name | 830 Operation | 832 number |
|---|---|---|---|---|---|---|---|
| 804 | 1.1 | 10.87.179.2 | 10:02 | 10:07 | Key 1 | Encrypt | 10 |
| 806 | 1.2 | 10.87.179.2 | 10:02 | 10:07 | Key 1 | Decrypt | 22 |
| 808 | 1.3 | 10.87.179.2 | 10:02 | 10:07 | Key 2 | Encrypt | 15 |
| 810 | 1.4 | 10.57.183.1 | 10:02 | 10:07 | Key 2 | Decrypt | 13 |
| 812 | 2.1 | 10.57.183.1 | 10:03 | 10:08 | Key 1 | Encrypt | 7 |
| 814 | 2.2 | 10.57.183.1 | 10:03 | 10:08 | Key 1 | Decrypt | 21 |
| 816 | 2.3 | 10.57.183.1 | 10:03 | 10:08 | Key 2 | Encrypt | 32 |
| 818 | 2.3 | 10.57.183.1 | 10:03 | 10:08 | Key 2 | decrypt | 14 |

*Figure 8*

| | 936 | 938 | 940 | 942 | 944 | 946 | 948 | 950 | 952 | 954 | 956 |
|---|---|---|---|---|---|---|---|---|---|---|---|
| | Index | IP | Start timestamp | End timestamp | Key name | Operation | number | New_start timestamp | New_end timestamp | ratio | New number |
| 904 | 1.1.1 | 10.87.179.2 | 10:02 | 10:07 | Key 1 | Encrypt | 10 | 10:00 | 10:05 | 0.6 | 6.0 |
| 906 | 1.1.2 | 10.87.179.2 | 10:02 | 10:07 | Key 1 | Encrypt | 10 | 10:05 | 10:10 | 0.4 | 4.0 |
| 908 | 1.2.1 | 10.87.179.2 | 10:02 | 10:07 | Key 1 | Decrypt | 22 | 10:00 | 10:05 | 0.6 | 13.2 |
| 910 | 1.2.2 | 10.87.179.2 | 10:02 | 10:07 | Key 1 | Decrypt | 22 | 10:05 | 10:10 | 0.4 | 8.8 |
| 912 | 1.3.1 | 10.87.179.2 | 10:02 | 10:07 | Key 2 | Encrypt | 15 | 10:00 | 10:05 | 0.6 | 9.0 |
| 914 | 1.3.2 | 10.87.179.2 | 10:02 | 10:07 | Key 2 | Encrypt | 15 | 10:05 | 10:10 | 0.4 | 6.0 |
| 916 | 1.4.1 | 10.87.179.2 | 10:02 | 10:07 | Key 2 | Decrypt | 13 | 10:00 | 10:05 | 0.6 | 7.8 |
| 918 | 1.4.2 | 10.87.179.2 | 10:02 | 10:07 | Key 2 | Decrypt | 13 | 10:05 | 10:10 | 0.4 | 5.2 |
| 920 | 2.1.1 | 10.57.183.1 | 10:03 | 10:08 | Key 1 | Encrypt | 7 | 10:00 | 10:05 | 0.4 | 2.8 |
| 922 | 2.1.2 | 10.57.183.1 | 10:03 | 10:08 | Key 1 | Encrypt | 7 | 10:05 | 10:10 | 0.6 | 4.2 |
| 924 | 2.2.1 | 10.57.183.1 | 10:03 | 10:08 | Key 1 | Decrypt | 21 | 10:00 | 10:05 | 0.4 | 8.4 |
| 926 | 2.2.2 | 10.57.183.1 | 10:03 | 10:08 | Key 1 | Decrypt | 21 | 10:05 | 10:10 | 0.6 | 12.6 |
| 928 | 2.3.1 | 10.57.183.1 | 10:03 | 10:08 | Key 2 | Encrypt | 32 | 10:00 | 10:05 | 0.4 | 12.8 |
| 930 | 2.3.1 | 10.57.183.1 | 10:03 | 10:08 | Key 2 | Encrypt | 14 | 10:05 | 10:10 | 0.4 | 5.6 |
| 932 | 2.3.2 | 10.57.183.1 | 10:03 | 10:08 | Key 2 | Decrypt | 32 | 10:00 | 10:05 | 0.6 | 19.2 |
| 934 | 2.3.2 | 10.57.183.1 | 10:03 | 10:08 | Key 2 | Decrypt | 14 | 10:05 | 10:10 | 0.6 | 8.4 |

Table 900

*Figure 9*

| 1020 Index | 1022 Key name | 1024 Operation | 1026 New_start timestamp | 1028 New_end timestamp | 1030 New number |
|---|---|---|---|---|---|
| 1004 | 1 | Key 1 | Encrypt | 10:00 | 10:05 | 8.8 |
| 1006 | 2 | Key 1 | Encrypt | 10:05 | 10:10 | 8.2 |
| 1008 | 3 | Key 1 | Decrypt | 10:00 | 10:05 | 21.6 |
| 1010 | 4 | Key 1 | Decrypt | 10:05 | 10:10 | 21.4 |
| 1012 | 5 | Key 2 | Encrypt | 10:00 | 10:05 | 21.8 |
| 1014 | 6 | Key 2 | encrypt | 10:05 | 10:10 | 25.2 |
| 1016 | 7 | Key 2 | Decrypt | 10:00 | 10:05 | 13.4 |
| 1018 | 8 | Key 2 | Decrypt | 10:05 | 10:10 | 13.6 |

Table 1000

*Figure 10*

SYSTEMS AND METHODS FOR LOG AGGREGATION

BACKGROUND

Logs record events that occur during the operation of an application on a computer system. Different logs from different programs and different systems can have different alignments of start times. A challenge is aggregating logs from different programs and systems with different start times.

SUMMARY

In general, in one aspect, embodiments are related to a method for log aggregation. A set of first log records having a first log record with a plurality of events are received. The set of first log records are duplicated using key operation pairs to generate a set of second log records from the set of first log records. The set of second log records are duplicated using a second set of intervals to generate a set of third log records from the set of second log records. The set of third log records are aggregated using the second set of intervals to generate a set of aggregated log records. The set of aggregated log records includes an aggregated log record with a number indicating a number of events from the set of first log records that have the key, that have the operation, and that occurred during an interval of the second set of intervals. The operation is identified by comparing the aggregated log record to a server log record.

In general, in one aspect, embodiments are related to a system with a memory coupled to a processor. A monitoring service executes on the processor, uses the memory, and is configured for log aggregation. A set of first log records having a first log record with a plurality of events are received. The set of first log records are duplicated using key operation pairs to generate a set of second log records from the set of first log records. The set of second log records are duplicated using a second set of intervals to generate a set of third log records from the set of second log records. The set of third log records are aggregated using the second set of intervals to generate a set of aggregated log records. The set of aggregated log records includes an aggregated log record with a number indicating a number of events from the set of first log records that have the key, that have the operation, and that occurred during an interval of the second set of intervals. The operation is identified by comparing the aggregated log record to a server log record.

In general, in one aspect, embodiments are related to a non-transitory computer readable medium with computer readable program code for log aggregation. A set of first log records having a first log record with a plurality of events are received. The set of first log records are duplicated using key operation pairs to generate a set of second log records from the set of first log records. The set of second log records are duplicated using a second set of intervals to generate a set of third log records from the set of second log records. The set of third log records are aggregated using the second set of intervals to generate a set of aggregated log records. The set of aggregated log records includes an aggregated log record with a number indicating a number of events from the set of first log records that have the key, that have the operation, and that occurred during an interval of the second set of intervals. The operation is identified by comparing the aggregated log record to a server log record.

Other aspects of the invention will be apparent from the following description and the appended claims.

BRIEF DESCRIPTION OF DRAWINGS

FIG. 7, FIG. 8, FIG. 9, and FIG. 10 show examples in accordance with one or more embodiments of the present disclosure.

DETAILED DESCRIPTION

Figure 1A:
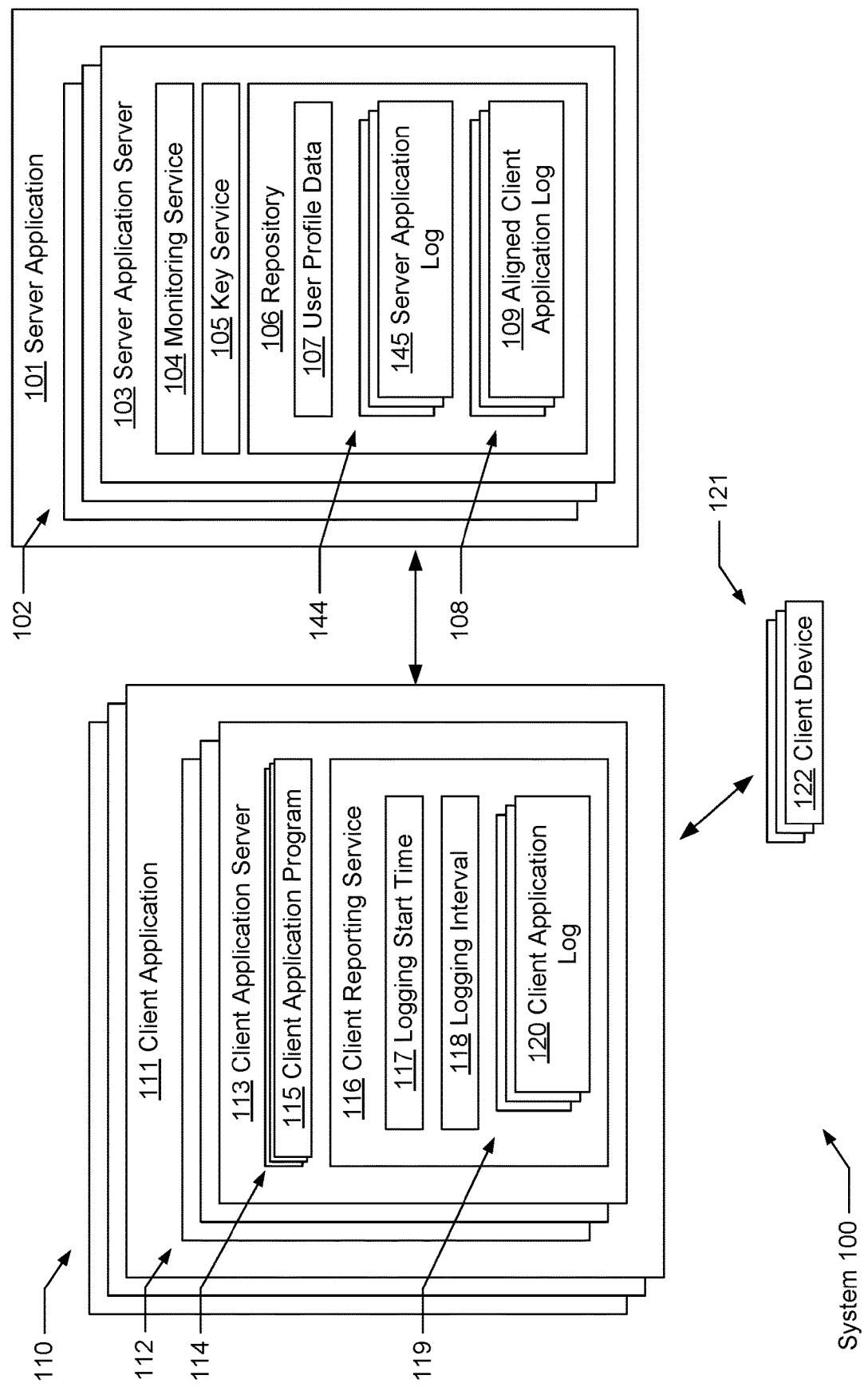
FIG. 1A, FIG. 1B, FIG. 1C, and FIG. 1D show a system in accordance with one or more embodiments of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure involve the aggregation of log files. As an example, an Software Development Kit (SDK) may be part of a client application and sends logs to a server application at regular intervals, such as every five minutes. The client application runs on several servers using several programs and each server may include a different "start time" so that the different servers are not synchronized with one another. SDK usage can be reported as a log file data source.

The log data from the SDK usage is parsed and saved in a tabular format, such as a dataframe, in which each row represents a combination of timestamp (such as a five minute window), service, network address, key name, operation name, number of operations and additional data. The ratios between each row timestamp and the previous and next 5-min windows are calculated (for example, timestamp of 10:02-10:07 has and overlap of 60% with the window 10:00-10:05 and 40% overlap with the window 10:05-10:10). The number of operations are multiplied by the ratio of the two windows and two new rows are created and replace the original row. Log aggregation can then be performed on the number of operations in each window (multiple rows are aggregated into one new row). The output is a dataframe in which each row includes fields for a unique timestamp, key name, operation, number of operations, etc. The output can then be used as the input for an anomaly detection model that analyzes the numbers of operations and events from the logs aggregated into the dataframe.

FIG. 1A, FIG. 1B, FIG. 1C, and FIG. 1D show diagrams of the system (100) in accordance with one or more embodiments of the invention. The various elements of the system (100) may correspond to the computing system shown in FIG. 11A and FIG. 11B. In particular, the type, hardware, and computer readable medium for the various components of the system (100) is presented in reference to FIG. 11A and FIG. 11B. In one or more embodiments, one or more of the elements shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Referring to FIG. 1A, the system (100) includes the server application (101), the client applications (110), and the client devices (121). The client devices (121) interact with the client applications (110), which interact with the server application (101).

The server application (101) is a set of programs that process requests from the client applications (110). In one or more embodiments, the server application (101) is a web service that is available to the client applications (110) over the internet or private networks and uses a standardized extensible markup language (XML) messaging system for receiving and transmitting requests using standard protocols including simple object access protocol (SOAP) and representational state transfer application programming interfaces (RESTful APIs). In one or more embodiments, the server application (101) gates access to the user profile data (107). In one or more embodiments, the server application (101) is a distributed application that executes on the server application servers (102).

The server application servers (102) include the server application server (103), which is a virtual machine instance that executes one or more of the programs that make up the server application (101). The server application server (103) operates on a physical computing device with processors and memory, such as the computing system (1100) and nodes (1122, 1124) described in FIGS. 11A and 11B. The server application server (103) hosts programs that include the monitoring service (104), the key service (105), and the repository (106).

The monitoring service (104) is a program that monitors access to the server application (101). In one or more embodiments, the monitoring service (104) records access requests received by the server application (101) to the repository (106) in the server application logs (144).

The key service (105) is a set of programs that provides access to cryptographic keys. In one or more embodiments, the cryptographic keys provided by the key service (105) are the keys needed to encrypt or decrypt information within the user profile data (107).

The repository (106) is a store of data and information used by the system (100). In one or more embodiments, the repository (106) is any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site. In one or more embodiments, the repository (106) includes the user profile data (107), the server application log (145), and the aligned client application log (109).

The user profile data (107) is a collection of records that identify and are associated with the users of the system (100). In one or more embodiments, the user profile data (107) includes names, birthdate, addresses, taxpayer identification numbers, government issued indication numbers, etc. The user profile data (107) can also include tax return information of the users.

The server application logs (144) include the server application log (145), which includes a server-side record of events that occur during operation of the server application (101). The server application logs (144) are server log records that record one or more types of events from one or more programs and services running on the server application servers (102). In one or more embodiments, the server application log (145) includes server log records of the encryption and decryption events handled by the server application (101) on one or more of the server application servers (102). In one or more embodiments, the server application log (145) includes an alignment and types of events that are similar to those of the aligned client application log (109). The alignment of the server application log (145) can be different from the alignment of the client application logs (119). In one or more embodiments, the server application logs (144) record SDK usage by the server application (101) that is in response to the SDK usage and API access of the client application programs (114) of the client applications (110).

The aligned client application logs (108) include the aligned client application log (109), which includes a client-side record of events that occur during operation of the client applications (110). The aligned client application logs (108) can record one or more types of events from one or more client applications (110), client application servers (112), and client application programs (114). The aligned client application logs (108) are generated from the client application logs (119) and are aligned to the server application logs (144). The alignment of the logs is discussed further below. In one or more embodiments, the aligned client application log (108) includes records of the encryption and decryption events generated by one or more client applications (110) using one or more of the client application servers (112). In one or more embodiments, the aligned client application log (109) includes an alignment and types of events that are similar to those of the server application log (145).

The client applications (110) include the client application (111), which is a set of programs that generate requests for services from the server application (101). In one or more embodiments, the client application (111) generates requests for encryption operations and decryption operations that require keys from the key service (105) to process information from the user profile data (107). In one or more embodiments, the client application (111) is a distributed application that executes on one or more of the client application servers (112).

The client application servers (112) include the client application server (113), which is a virtual machine instance that executes one or more of the programs that make up the client application (111). The client application server (113) operates on a physical computing device with processors and memory, such as the computing system (1100) and nodes (1122, 1124) described in FIGS. 11A and 11B. The client application server (113) hosts client application programs (114) and the client reporting service (116).

The client application programs (114) include the client application program (115), which is one of the programs that makes up the client application (111). In one or more embodiments, client application program (115) reads and writes information to the user profile data (107) with keys from the key service (105). For example, the client application program (115) can be a tax preparation program that is used to prepare tax reporting documents and access prior tax and personally identifying information from the user profile data (107).

The client reporting service (116) is a program that operates on the client application server (113). The client reporting service (116) logs events that are generated by one or more client application programs (114) from one or more client application servers (112), for one or more client applications (110). In one or more embodiments, the client reporting service (116) logs the encryption and decryption operations that are requested by the client application programs (114) on the client application server (113) to be handled by the server application (101). The client reporting service (116) includes the logging start time (117), the logging interval (118), and the client application logs (119).

The logging start time (117) identifies the start time of the logging performed by the client reporting service (116). In one or more embodiments, the logging start time (117) is the time that the client reporting service (116) began logging information and is influenced by the start time of the client application server (113) and the start times of the client application programs (114) that are being monitored by the client reporting service (116).

The logging interval (118) identifies a duration of time that the client application logs (119) cover. In one or more embodiments, the duration is five minutes for the client application log (120). In one or more embodiments, different client application logs (119) that track different operations can have different logging intervals. Furthermore, the logging intervals for different client application servers (112) and different client applications (110) can also have different logging intervals.

The client application logs (119) include the client application log (120), which includes a client side record of events that occur during operation of the client application (111). The client application logs (119) record one or more types of events from one or more client application programs (114) and services running on the client application servers (112) for the client applications (110). In one or more embodiments, the client application log (120) includes records of the encryption and decryption events handled by the client application (111) on one or more of the client application servers (112). In one or more embodiments, the client application log (120) includes an alignment that is different from the alignments of the aligned client application log (109) and the server application log (145). The client application logs (119) form the basis used to generate the aligned client application logs (108). The client application logs (119) have an alignment of log start times, which is further described below.

The client devices (121) include the client device (122) and are used to access the client applications (110), which access the server application (101). In one or more embodiments, the client device (122) is a computing system that executes one or more of programs on a physical computing device with processors and memory, such as the computing system (1100) and nodes (1122, 1124) described in FIGS. 11A and 11B. In one or more embodiments, the client applications (110) include a tax preparation service and a website service that are accessed by the client device (122) for a user to prepare tax filing documents. For example, the client device (122) can be a smartphone, tablet computer, desktop computer, etc., that executes a web browser that accesses the website, which provides access to a tax preparation service. In one or more embodiments, the client devices (121) can be used by developers to access and analyze the logs generated with the system, including the client application logs (120), the server application logs (144), and the aligned client application logs (108).

Figure 1B:
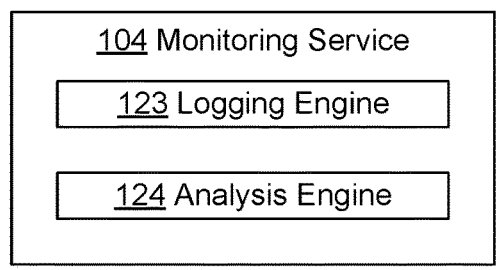

Referring to FIG. 1B, the logging engine (123) of the monitoring service (104) is a set of programs that generate the logs used by the system (100). In one or more embodiments, the logging engine (123) generates the server application logs (144) from the requests received by the server application (101) from the client applications (110). In one or more embodiments, the logging engine (123) generates the aligned client application logs (108) from the client application logs (119).

The analysis engine (124) is a set of programs that analyze the logs of the system (100). In one or more embodiments, the analysis engine (124) compares or more of the aligned client application logs (108) to one or more of the server application logs (145) to detect anomalies. For example, an anomaly can be detected when the server application logs (145) include events and operations that are not also included in the aligned client application logs (108).

Figure 1C:
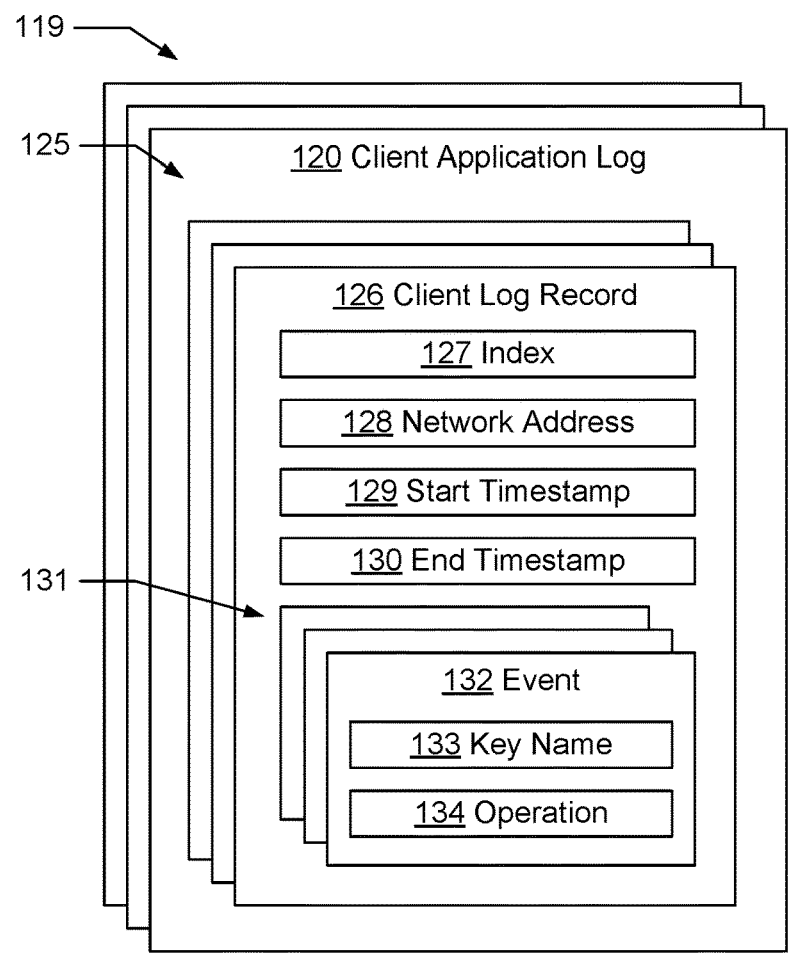

Referring to FIG. 1C, the client application logs (119) include the client application log (120), which includes the client log records (125). The client log records (125) include the client log record (126), which includes the index (127), the network address (128), the start timestamp (129), the end timestamp (130), and the events (131).

The index (127) is a unique identifier for the client log record (126). The index (127) distinguishes the client log record (126) from another client log record within the client log records (125).

The network address (128) is a numerical label that identifies the client application server (113) that generated the events (131) that are part of the client log record (126). The network address (128) is in accordance with one or more standard protocols including internet protocol version 4 (IPv4), internet protocol version 6 (IPv6), etc.

The start timestamp (129) is a value that identifies the earliest time that the events (131) could have occurred. The end timestamp (130) is a value that identifies the last time that the events (131) could have occurred. In one or more embodiments, the start timestamp (129) and the end timestamp (130) include a date, a time, and fractions of a second in accordance with the International Organization for standardization (ISO) 8601 standard with values to identify one or more of a year, month, week, day, hour, minute, second, microsecond, etc.

The start timestamp (129) together with the end timestamp (130) form an interval and are part of an alignment. The interval is the amount of time between the start timestamp (129) and the end timestamp (130). The alignment identifies the periodicity of the start timestamps and end timestamps of the client log records (125). For example, a set of client log records can have an interval of 5 minutes with an alignment of 0 minutes past the hour such that a first client log record would be from 00:00 to 00:05, a second client log record would be from 00:05 to 00:10, and so on. For different logs to be in alignment, the start times and end times for each of the records in the log need to be the same between the different logs so that the logs would have the same alignment of log start times. The intervals and alignments of the start and end timestamps in the client log records (125) can be different based on which client reporting service (116) generates the client log record (126), which client application program (115) generates the request logged as the event (132), which client application server (113) is hosting the client application program (115), and which client application (111) includes the client application program (115).

The events (131) include the event (132). The events (131) identify requests made by the client applications (110) to the server application (101). The event (132) includes the key name (133) and the operation (134). In one or more embodiments, the events (131) are stored sequentially within the client log record (126) and the order in which the events (131) occurred can be determined from the sequence without timestamps for the individual events. In one or more embodiments, the events (131) are records of the usage of a software development kit (SDK) by one or more client application programs (110) of the client applications (110).

The key name (133) identifies a key used with the operation (134). In one or more embodiments, the key identified by the key name (133) is a cryptographic key that is required to access the user profile data (107).

The operation (134) identifies an operation requested by one of the client application programs (114) of one of the client applications (110). The operation is requested in a message sent to the server application (101). In one or more embodiments, the operations include operations for decryption and encryption.

Figure 1D:
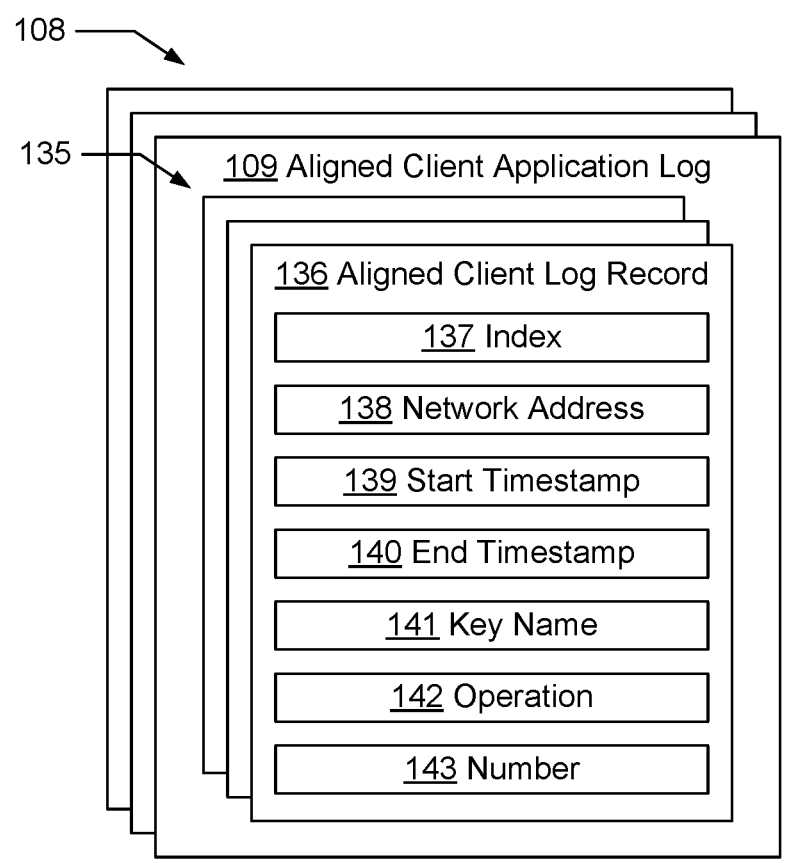

Referring to FIG. 1D, the aligned client application logs (108) include the aligned client application log (109), which includes the aligned client log records (135). The aligned client log records (135) include the aligned client log record (136), which includes the index (137), the network address (138), the start timestamp (139), the end timestamp (140), the key name (141), the operation (142), and the number (143).

The index (137) is a unique identifier for the aligned client log record (136). The index (137) distinguishes the aligned client log record (136) from another client log record within the aligned client log records (135).

The network address (138) is a numerical label that identifies the client application server (113) that generated the operation (142). The network address (138) is in accordance with one or more standard protocols including internet protocol version 4 (IPv4), internet protocol version 6 (IPv6), etc.

The start timestamp (139) is a value that identifies the earliest time that the operation (142) could have occurred with respect to the aligned client log record (136). The end timestamp (140) is a value that identifies the last time that the operation (142) could have occurred with respect to the aligned client log record (136). In one or more embodiments, the start timestamp (139) and the end timestamp (140) include a date, a time, and fractions of a second in accordance with the International Organization for standardization (ISO) 8601 standard with values to identify one or more of a year, month, week, day, hour, minute, second, microsecond, etc.

The key name (141) identifies a key used with the operation (142). In one or more embodiments, the key identified by the key name (141) is a cryptographic key that is required to access the user profile data (107).

The operation (142) identifies an operation requested by one of the client application programs (114) of the client applications (110). The operation is requested in a message sent to the server application (101) as part of an SDK. In one or more embodiments, the operations include operations for decryption and encryption.

The number (143) identifies the number of times the operation (140) was requested and accessed with the SDK using the key identified by the key name (141) from the network address (138) during the interval identified by the start timestamp (139) and the end timestamp (140). In one or more embodiments, the number (143) is generated by aggregating the events (131) from the client log records (126) of the client application logs (120) that have the same operation (134), key name (133), and network address (128).

FIGS. 2 through 6 show flowcharts in accordance with one or more embodiments of the present disclosure. The flowcharts of FIGS. 2 through 6 depict a process (200) that includes log aggregation. The process (200) can be implemented on one or more components of the system (100) of FIG. 1. In one or more embodiments, one or more of the steps shown in FIGS. 2 through 6 may be omitted, repeated, combined, and/or performed in a different order than the order shown in FIGS. 2 through 6. Accordingly, the scope of the present disclosure should not be considered limited to the specific arrangement of steps shown in FIGS. 2 through 6.

Figure 2:
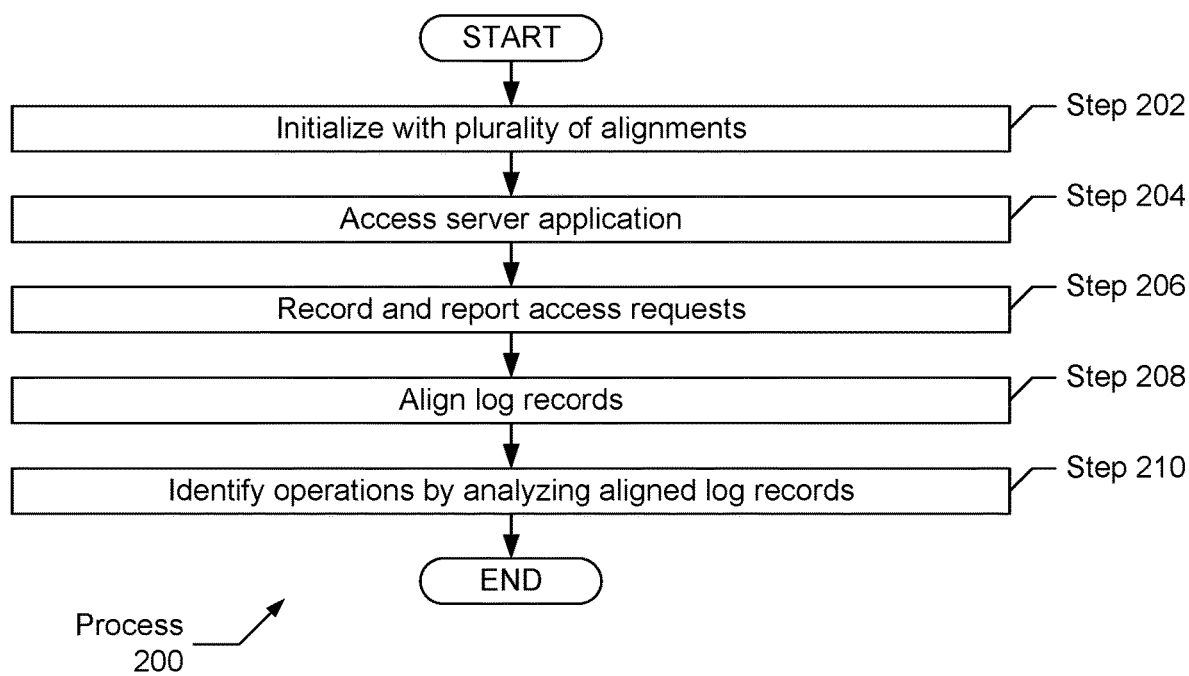
FIG. 2, FIG. 3, FIG. 4, FIG. 5, and FIG. 6 show methods in accordance with one or more embodiments of the present disclosure.

Referring to FIG. 2, in Step 202, initialization is performed with a plurality of alignments. To initialize an application (such as the client applications (110) and the server application (101)) application servers are allocated to the application and the application programs and services are started on the application servers. The start times for the applications, servers, programs, and services can each be different. Additionally, after an application has been initialized, the servers, programs, and services used by the application can be individually restarted, such as when a server, program, or service, encounters an error. Servers, programs, and services can be arbitrarily removed from and added to the application. For example, during peak times when the client applications are interacting with several client devices, the number of servers can be increased to handle the increased load. With all of the different start times for the servers, programs, and services, the reporting services that generate the application logs can have different logging start times. With different logging start times, the alignment of log start times can be different for the logs from the same or different applications, even when the events being logged are for the same operations using the same keys from the same application.

In Step 204, the server application is accessed. In one or more embodiments, the client application accesses the server application in response to interaction with the client devices. In one or more embodiments, the access by the client application is through a RESTful API exposed by the server application for access to the key service and user profile data that are a part of the server application. For example, when the client application is a tax preparation website, a client device can interact with the client application to retrieve information from a prior tax return that is stored in the user profile data by the server application. The client application uses the API exposed by the server to access the information from the user profile data with a key provided by the key service from the server application.

In Step 206, access requests are recorded and reported. In one or more embodiments, the reporting services of the client applications record the server access requests generated by the programs of the client application as events in client application logs. Additionally, the monitoring service of the server application records the client requests into the server application logs that are stored in the repository. After the client application logs are recorded by the client reporting services, the client reporting services report the client application logs by transmitting the client application logs to the monitoring service of the server application, which can be done continuously, periodically, and on demand.

In Step 208, log records are aligned. In one or more embodiments, the monitoring service of the server application processes the logs to generate aligned logs that are stored in the repository. In one or more embodiments, the aligned logs are generated from one or more of the client application logs and the server application logs. Aligning the logs is further described below with FIGS. 3 through 6.

In Step 210, operations are identified by analyzing the aligned log records. In one or more embodiments, the operations described in the aligned client application logs are compared to the operations described in the server application logs. For example, the number of requests recorded in the server application log for an operation using a key from a network address is compared to the number of requests recorded in the aligned client application log for the same operation, key, and network address. When the number of requests do not match, and are a mismatch, the operation is identified as having a mismatched number of requests, which may be indicative of unauthorized access to the server application.

Figure 3:
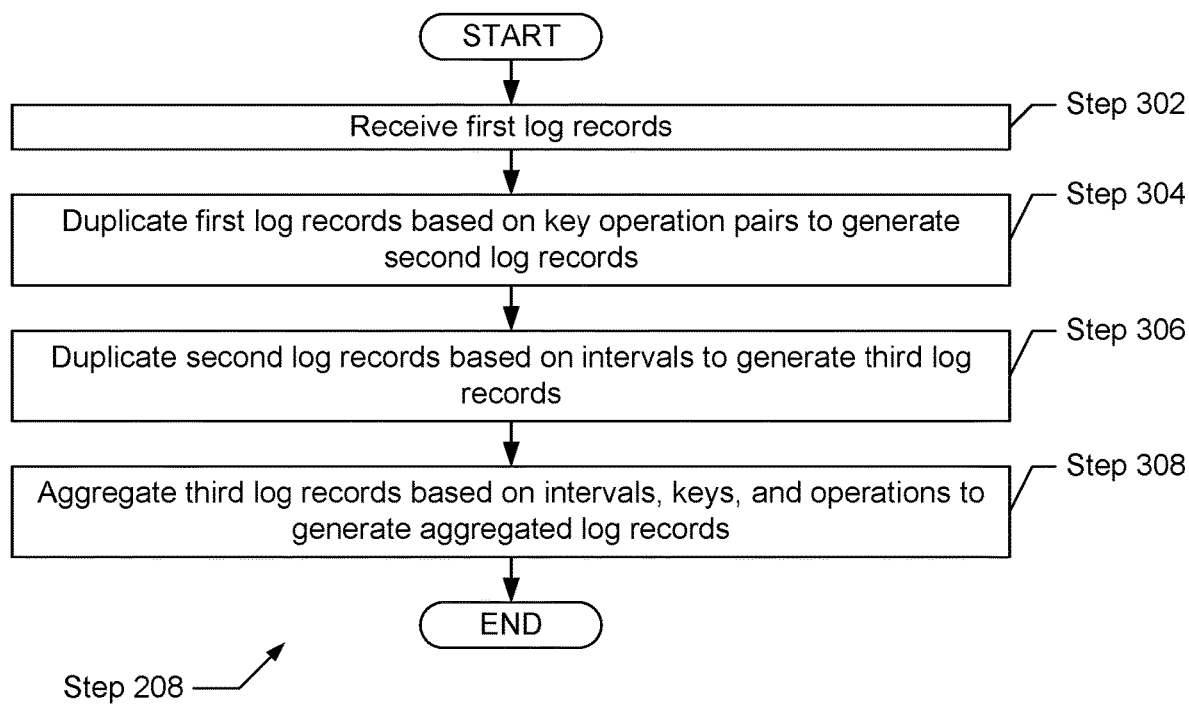

Referring to FIG. 3, Step 208 of FIG. 2 is described with additional detail. In Step 302, first log records are received. An example of first log records is included in FIG. 7, described below. In one or more embodiments, the first log records include the client application log records generated by the client reporting service in response to the requests made by the client applications to the server application. The monitoring service of the server application receives the client application log records from the client reporting services of the client applications.

In Step 304, first log records are duplicated based on key operation pairs to generate second log records. An example of second log records is included in FIG. 8, described below. In one or more embodiments, the second log record is a first intermediate log record generated from the first log record that is used to generate the aligned client application log records. In one or more embodiments, the second log records include fields for an index, a network address, a start timestamp, an end timestamp, a key name, an operation, and a number.

The index can be derived from the index of the first log record by appending an additional value to the value of the index from the first log record. The network address, start timestamp, and the end timestamp, can be copied from the first log record into the second log record. The key name and operation fields of the second log record match to a key name and operation of a key operation pair from the list of key operation pairs from the first log record.

Figure 4:
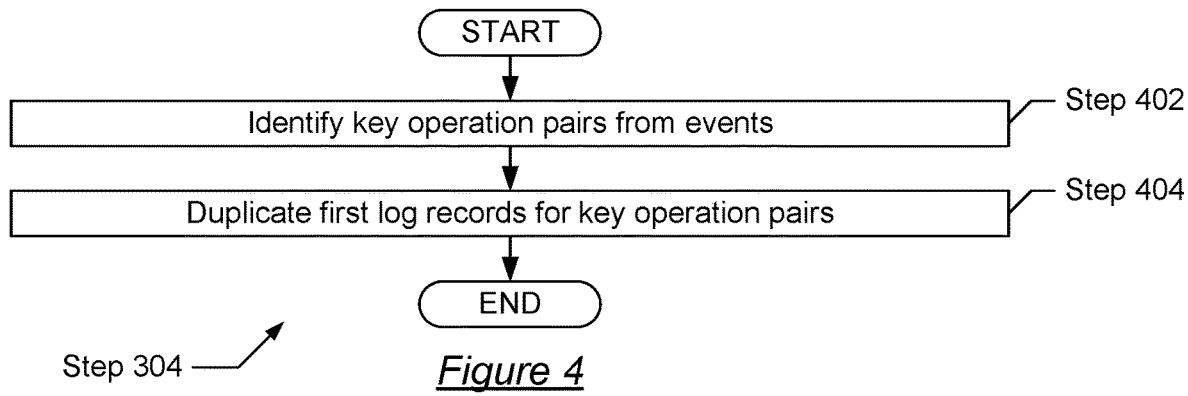

The number in the second log record is generated from analyzing the events from the first log record. The number in the second log record identifies the number of times that the key operation pair identified by the key name and the operation occurred in the list of key operation pairs from the first log record. FIG. 4 below provides additional detail of Step 304.

In Step 306, second log records are duplicated based on intervals to generate third log records. An example of third log records is included in FIG. 9, described below. In one or more embodiments, the third log records are second intermediate log records that are generated from the first intermediate log records and are used to generate the aligned log records. In one or more embodiments, the third log records include fields for an index, a network address, a first start timestamp, a first end timestamp, a key name, an operation, a first number, a second start timestamp, a second end timestamp, a ratio, and a second number. The index of the third log record can be derived from the index of the second log record by appending an additional value to the value of the index from the second log record. The network address, first start timestamp, first end timestamp, key name, operation, and first number fields can be copied from the similar fields from the second log record.

The second start timestamp and the second end timestamp are in accordance with the alignment required by the aligned log records. The second start timestamp is aligned with the alignment of log start times that will be used in the aligned log records.

Multiple third log records can be generated for a single second log record based on the alignment and intervals of the start and end timestamps for the second log record and the third log records. When the intervals are the same between the second log records and the third log records and the alignments do not match, then two contiguous third log records are generated from a single second log record. For example a second log record with a five minute interval from 10:02 to 10:07 can be duplicated to form two third log records with contiguous five minute intervals from 10:00 to 10:05 and from 10:05 to 10:10. In additional or alternative embodiments, the intervals can be different. For example, a second log record with a five minute interval from 10:02 to 10:07 can be duplicated to form three third log records with contiguous two minute intervals from 10:02 to 10:04, from 10:04 to 10:06, and from 10:06 to 10:08.

The ratios of the third log records are determined from a first interval and a second interval. The first interval is defined by the first start timestamp and the first end timestamp of the third log record. The second interval is defined by the second start timestamp and the second end timestamp of the third log record. In one or more embodiments, the ratio is calculated by identifying the amount of overlap between the first interval and the second interval and dividing the amount of overlap by the duration of the first interval. The amount of overlap can be calculated using Equation 1 below.

$$\text{Overlap} = \text{MIN}(ETS1, ETS2) - \text{MAX}(STS1, STS2) \quad \text{Eq. (1)}$$

where $$\text{MIN}(ETS1, ETS2) > \text{MAX}(STS1, STS2) \quad \text{Eq. (2)}$$

MIN(ETS1, ETS2) returns the minimum value from the values of the first end timestamp (ETS1) and the second end timestamp (ETS2).

MAX(STS1, STS2) returns the maximum value from the values of the first start timestamp (STS1) and the second start timestamp (STS2).

Figure 5:
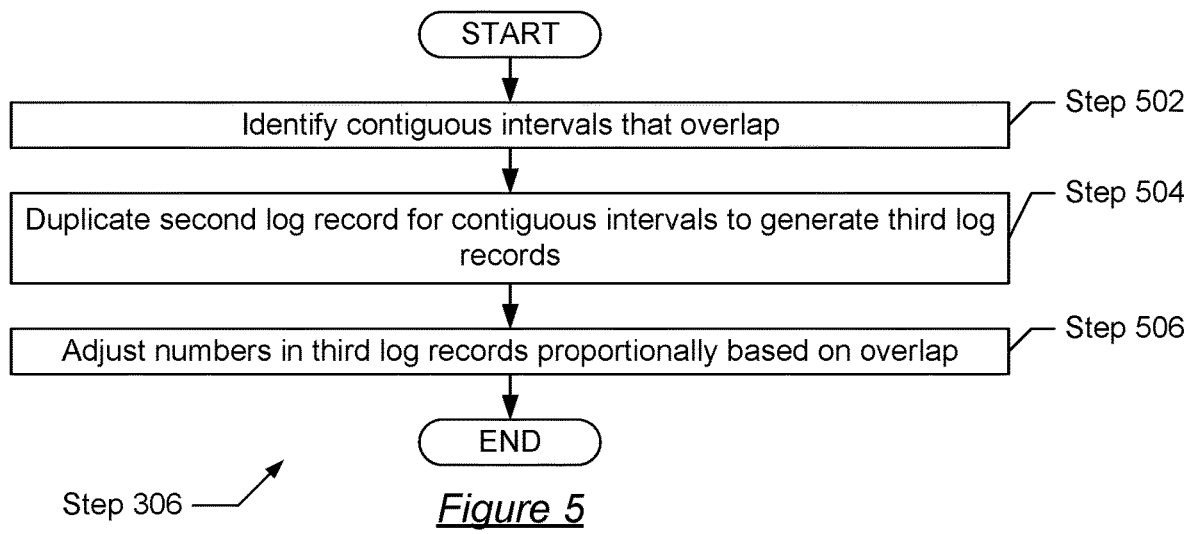

The second number is generated from the first number and the ratio. In one or more embodiments, the first number is multiplied by the ratio to calculate the second number. FIG. 5 below provides additional detail of Step 306.

Figure 6:
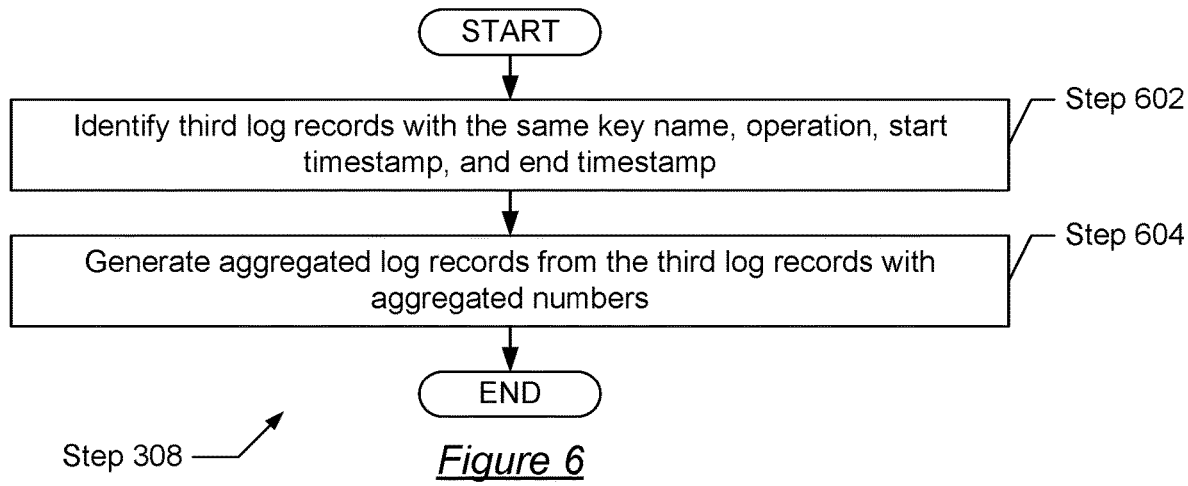

In Step 308, third log records are aggregated based on intervals, keys, and operations to generate aggregated log records. An example of aggregated log records is included in FIG. 10, described below. In one or more embodiments, the aggregated log records are aligned log records that are generated from the second intermediate log records. In one or more embodiments, the aligned log records form the aligned client application log records generated by the monitoring service of the server application. In one or more embodiments, the aggregated log records include fields for an index, a key name, an operation, a start timestamp, an end timestamp, and a number. The aggregated log records are generated from the third log records and the index, key name, operation, start timestamp, and end timestamp, fields can be copied from the similar fields from the third log record. The number of the aggregated log record is the sum of the second numbers from the third log records that have the same key name, operation, second start timestamp, and second end timestamp. FIG. 6 below provides additional detail of Step 308.

Referring to FIG. 4, Step 304 from FIG. 3 is described in additional detail. In Step 402, key operation pairs are identified from events. In one or more embodiments, a first log record includes multiple events that have key operation pairs. In one or more embodiments, the number of distinct key operation pairs is identified by scanning a list of the key operation pairs and removing key operation pairs that have the same key and the same operation. In addition to identifying the number of distinct key operation pairs, a count is kept for each distinct key operation pair to identify the number of times the distinct key operation pair was present in the events from the first log record.

In Step 404, first log records are duplicated for the key operation pairs. In one or more embodiments, second log records are created from the first log record for the distinct key operation pairs identified from the events of the first log record. Individual second log records include a number that identifies the number of times that the distinct key operation pair of the second log record was encountered in the events from the first log record.

Referring to FIG. 5, Step 306 from FIG. 3 is described in additional detail. In Step 502, contiguous intervals that overlap are identified. In one or more embodiments, when the alignment of a second log record does not match a targeted alignment, then multiple contiguous intervals that are in accordance with the targeted alignment are identified so that the start time of the first continuous interval is less than the start time of the second log record and the end time of the last contiguous interval is greater than the end timestamp of the second log record. The contiguous intervals are in juxtaposition and the time frame of the contiguous intervals fully overlaps the time frame of the interval of the second log record.

In Step 504, second log records are duplicated for the contiguous intervals. In one or more embodiments, for each contiguous interval that was identified, a third log record is created from the second log record. In one or more embodiments, duplicating the second log record for each of the contiguous intervals of the set of one or more contiguous intervals to form the set of third log records that each have a number that is equivalent to the number from the second log record that identifies the number of occurrences of the key operation pair.

In Step 506, numbers in the third log records are adjusted proportionally based on overlap. In one or more embodiments, the number of key operation pair occurrences is initially copied from the second log record, which identifies the number of occurrences during the entire time frame of the second log record. The number is adjusted for the third log record to be proportional to the amount of overlap between the time frame of the contiguous interval of the third log record and the time frame of the interval of the second log record. Equation 1 from above can be used to determine the overlap. The overlap is divided by the time frame of the second log record to generate a ratio that is based on a continuous distribution. The ratio is multiplied by the number of key operation pair occurrences from the second log record to generate the proportionally adjusted number of key operation pair occurrences in the third log record. The proportional adjustment is made for each of the contiguous intervals of the third log records that overlap with the interval of the second log record.

Referring to FIG. 6, Step 308 from FIG. 3 is described in additional detail. In Step 602, third log records with the same key name, operation, start timestamp, and end timestamp are identified. In one or more embodiments, third log records are scanned to identify the sets of third log records that have the same key name, operation, start timestamp, and end timestamp.

In Step 604, aggregated log records are generated from the third log records with aggregated numbers. In one or more embodiments, an aggregated log record is generated from a set of third log records that have the same key name, operation, start timestamp, and end timestamp. The number in the aggregated log record is the sum of the numbers from the set of third log records, which forms an aggregated number.

Referring to FIG. 7, the table (700) includes first log records that have not been aligned in accordance with one or more embodiments of the present disclosure. The first log records are in a tabular form with rows and columns and can be presented using one or more components of the system (100) of FIG. 1. For example, the client devices (121) of FIG. 1 can show one or more of the depicted rows and columns to a user. In one or more embodiments, one or more of the rows and columns shown in FIG. 7 may be omitted, repeated, combined, and/or presented in a different order than the order shown in FIG. 7. Accordingly, the scope of the present disclosure should not be considered limited to the specific arrangement of rows and columns shown in FIG. 7.

The table (700) includes a set of rows (702)-(706) and a set of columns (708)-(716) formatted in a tabular form. The row (702) is a header row with values that identify the names of the fields shown in the columns (708)-(716). Rows (704)-(706) are records that include values for the fields identified by the columns (708)-(716).

The column (708) is for an index. The index uniquely identifies the records within the table (700).

The column (710) is for a network address. The network address identifies the machine, such as a client application server, that generated the operation request identified in the column (716). In one or more embodiments, the network address is an IPv4 address.

The columns (712) and (714) are respectively for start timestamps and end timestamps. The start timestamps and end timestamps define the intervals during which the operations identified in the column (716) were requested. The values displayed in the columns (712) and (714) include an hour value and a minutes value. Additional embodiments can include additional values for the year, month, day, week, seconds, etc.

The column (716) details the operations for a record. In one or more embodiments, the values in the column (716) include a serialized human readable string in a standard format, such as JavaScript Object Notation (JSON). The string forms a list that enumerates a plurality of key operation pairs that identify the keys used and operations requested using an SDK during the interval defined by the start timestamp in the column (712) and end timestamp in the column (714) from the network address identified in the column (710). A partial example of the text provided in the row (704) and the column (716) can be seen below, where two encrypt operations using "Key 1" are followed by a decrypt operation also using "Key 1".

```
...
{
  "key": "Key 1",
  "Operation": "Encrypt"
},
{
  "key": "Key 1",
  "Operation": "Encrypt"
},
{
  "key": "Key 1",
  "Operation": "Decrypt"
},
....
```

Referring to FIG. 8, the table (800) includes second log records generated from first log records in accordance with one or more embodiments of the present disclosure. The second log records are in a tabular form with rows and columns and can be presented using one or more components of the system (100) of FIG. 1. For example, the client devices (121) of FIG. 1 can show one or more of the depicted rows and columns to a user. In one or more embodiments, one or more of the rows and columns shown in FIG. 8 may be omitted, repeated, combined, and/or presented in a different order than the order shown in FIG. 8. Accordingly, the scope of the present disclosure should not be considered limited to the specific arrangement of rows and columns shown in FIG. 8.

The table (800) includes a set of rows (802)-(818) and a set of columns (820)-(832). The row (802) is a header row with values that identify the names of the fields shown in the columns (820)-(832). Rows (804)-(818) are records that include values for the fields identified by the columns (820)-(832).

The column (820) is for an index. The index uniquely identifies the records within the table (800). In one or more embodiments, the index of table (800) is generated by appending and additional value to the index from the table (700). The original value from the table (700) identifies the first log record used to generate the second log record in the table (800). The additional value that is appended identifies the order of the second log records generated from the first log records. For example, the second log record of row (810) has an index value of "1.4". The "1" indicates that the second log record of the row (810) was generated from the first log record of row (704) of table (700), which is the first record in the table (700). The "4" from the index value "1.4" indicates that the second log record of the row (810) is the fourth record generated from the first log record of row (704) of table (700).

The column (822) is for a network address. The network address at the column (822) can be copied from the network address at the column (710) of table (700) for the first log record identified by the index in the column (820).

The columns (824) and (826) are respectively for start timestamps and end timestamps. The start timestamps and end timestamps of the columns (824) and (826) can be copied from the columns (712) and (714) of the table (700) for the first log record identified by the index in the column (820).

The column (828) is for a key name and the column (830) is for an operation. The key name at the column (828) and the operation at the column (830) can be extracted from the key operation pairs provided in the column (716) of the table (700) for the first log record identified by the index in the column (820).

The column (832) is for a number occurrences. The value in the column (832) identifies the number of occurrences that the key operation pairs identified in the columns (828) and (830) occurred in the lists of key operation pairs in the column (716) of the table (700) for the first log record identified by the index in the column (820). For example, the value in the row (808) and the column (832) of "15" indicates that the encrypt operation was requested with the key name "Key 2" fifteen times from the network address "10.87.179.2" during the time interval of 10:02 to 10:07.

Referring to FIG. 9, the table (900) includes third log records generated from second log records in accordance with one or more embodiments of the present disclosure. The third log records are in a tabular form with rows and columns and can be presented using one or more components of the system (100) of FIG. 1. For example, the client devices (121) of FIG. 1 can show one or more of the depicted rows and columns to a user. In one or more embodiments, one or more of the rows and columns shown in FIG. 9 may be omitted, repeated, combined, and/or presented in a different order than the order shown in FIG. 9. Accordingly, the scope of the present disclosure should not be considered limited to the specific arrangement of rows and columns shown in FIG. 9.

The table (900) includes a set of rows (902)-(934) and a set of columns (936)-(956). The row (902) is a header row with values that identify the names of the fields shown in the columns (936)-(956). Rows (904)-(934) are records that include values for the fields identified by the columns (936)-(956).

The column (936) is for an index. The index uniquely identifies the records within the table (900). In one or more embodiments, the index of table (900) is generated by appending and additional value to the index from the table (800). The original value from the table (800) identifies the second log record used to generate the third log record in the table (900). The additional value that is appended identifies the order of the third log records generated from the second log records. For example, the third log record of row (918) has an index value of "1.4.2". The "1" identifies the first log record at the row (704) of the table (700), the "1.4" identifies the second log record at the row (810) of the table (800), and the "2" indicates that the third record at the row (918) is the second record generated from the record at the row (810) from the table (800).

The columns (938) through (948) are respectively for the network address, start timestamp, end timestamp, key name, operation, and number. The values in the columns (938) through (948) can be copied from the values in the columns (822) through (832) of the table (800) for the records identified in the index in the column (936).

The columns (950) and (952) are respectively for new start timestamps and new end timestamps. The new start timestamps and new end timestamps are for the target intervals and are in accordance with a target alignment.

The column (954) is for the ratios of the third log records. As described above, the ratios are determined by dividing an overlap by an original interval. The overlap is determined using the timestamps from the columns (940), (942), (950), and (952). The original intervals are determined from the columns (940) and (942).

The column (956) is for the adjusted number of occurrences. In one or more embodiments, the adjusted number of occurrences is determined by multiplying the values from the column (948) by the values from the column (954) and represent the number of occurrences from the original interval defined by the columns (940) and (942) that occurred during the target interval defined by the columns (950) and (952), using a continuous distribution of the occurrences during the original interval.

Referring to FIG. 10, the table (1000) includes aggregated log records generated from third log records that are aligned and aggregated in accordance with one or more embodiments of the present disclosure. The aggregated log records are in a tabular form with rows and columns and can be presented using one or more components of the system (100) of FIG. 1. For example, the client devices (121) of FIG. 1 can show one or more of the depicted rows and columns to a user. In one or more embodiments, one or more of the rows and columns shown in FIG. 10 may be omitted, repeated, combined, and/or presented in a different order than the order shown in FIG. 10. Accordingly, the scope of the present disclosure should not be considered limited to the specific arrangement of rows and columns shown in FIG. 10.

The table (1000) includes a set of rows (1002)-(1018) and a set of columns (1020)-(1030). The row (1002) is a header row with values that identify the names of the fields shown in the columns (1020)-(1030). Rows (1004)-(1018) are records that include values for the fields identified by the columns (1020)-(1030).

The column (1020) is for an index. The index uniquely identifies the records within the table (1000).

The columns (1022) through (1028) are respectively for the key name, operation, start timestamp, and end timestamp. The values in the columns (1038) through (1048) can be copied from the values in the columns (944), (946), (952), and (952) of the table (900) for the records identified in the index in the column (1020).

The column (1030) is for the aggregated number of occurrences. In one or more embodiments, the aggregated number of occurrences is determined by summing values from the column (956). For example, the rows (906) and (922) have the same key name, operation, target start timestamp, and target end timestamp in the columns (944), (946), (952), and (952) of the table (900). The values "4.0" from the row (906) and "4.2" from the row (922) of the column (956) of the table (900) are summed to generate the value "8.2" at the row (1006) of the table (1000).

Figure 11A:
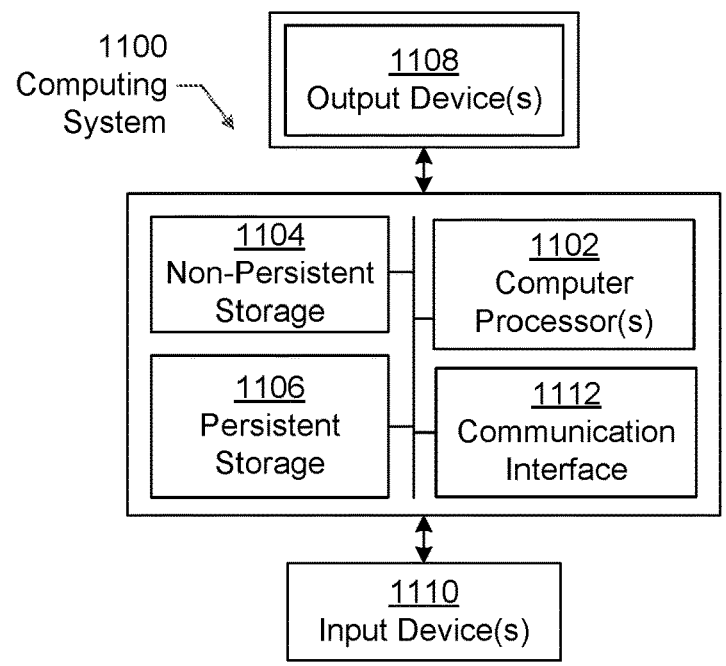
FIGS. 11A and 11B show computing systems in accordance with disclosed embodiments.

Embodiments may be implemented on a computing system. Any combination of mobile, desktop, server, router, switch, embedded device, or other types of hardware may be used. For example, as shown in FIG. 11A, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), and numerous other elements and functionalities.

The computer processor(s) (1102) may be an integrated circuit for processing instructions. For example, the computer processor(s) may be one or more cores or micro-cores of a processor. The computing system (1100) may also include one or more input devices (1110), such as a touchscreen, keyboard, mouse, microphone, touchpad, electronic pen, or any other type of input device.

The communication interface (1112) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 11B:
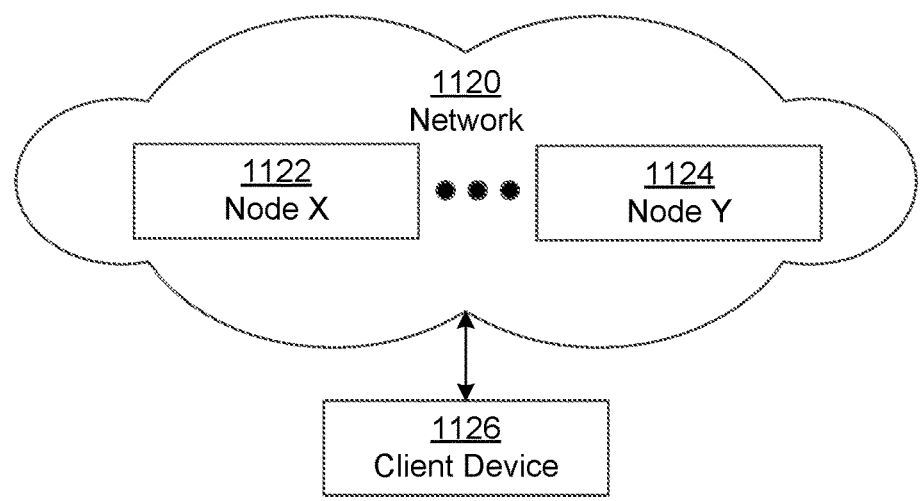

The computing system (1100) in FIG. 11A may be connected to or be a part of a network. For example, as shown in FIG. 11B, the network (1120) may include multiple nodes (e.g., node X (1122), node Y (1124)). Nodes may correspond to a computing system, such as the computing system shown in FIG. 11A, or a group of nodes combined may correspond to the computing system shown in FIG. 11A. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (1100) may be located at a remote location and connected to the other elements over a network.

Although not shown in FIG. 11B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system shown in FIG. 11A. Further, the client device (1126) may include and/or perform at least a portion of one or more embodiments of the disclosure.

The computing system or group of computing systems described in FIGS. 11A and 11B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 11A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 11A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 11A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 11A and the nodes and/or client device in FIG. 11B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method for log aggregation, comprising:
   receiving a set of first log records having a first log record comprising a plurality of events, wherein the first loci record includes a first format, wherein the first log record includes multiple log key operation pairs, and wherein the plurality of events occurs during a first set of intervals and includes an event comprising a key and an operation name;
   duplicating the set of first log records using key operation pairs to generate a set of second log records from the set of first log records, wherein the set of second log records includes a second log record that includes a single log key operation pair from the multiple log key operation pairs from the first log record;
   duplicating the set of second log records using a second set of intervals to generate a set of third log records from the set of second log records, wherein a third log record of the set of third log records identifies a first interval of the first set of intervals and identifies a second interval of the second set of intervals;
   aggregating the set of third log records using the second set of intervals to generate a set of aggregated log records, wherein the set of aggregated log records includes an aggregated log record comprising an aggregated number indicating a number of events from the set of first log records that have the key, that have the operation name, and that identifies the second interval of the second set of intervals;

generating the aggregated log record from a plurality of third log records, which are from the set of third log records; and identifying the operation name by comparing the aggregated log record to a server log record.

2. The method of claim 1, wherein the first log records include a first log record that has a first alignment of log start times that is different from a second alignment of log start times of the aggregated log record.

3. The method of claim 1,
wherein the first format is serialized human-readable text,
wherein the first log record of the set of first log records identifies a first interval of the first set of intervals, and
wherein the second log record of the set of second log records identifies the first interval of the first set of intervals.

4. The method of claim 3,
wherein the first format is a JavaScript object notation (JSON) format, and
wherein the first log record includes a second format that includes a tabular form.

5. The method of claim 1, further comprising:
identifying a plurality of key operation pairs from the plurality of events of the first log record of the set of first log records; and
duplicating the first log record for each key operation pair of the plurality of key operation pairs.

6. The method of claim 5, further comprising:
identifying a set of one or more contiguous intervals that fully overlap the interval of a second log record of the set of second log records;
duplicating the second log record for each of the contiguous intervals of the set of one or more contiguous intervals to form a first group of third log records within the set of third log records that each have a third number equivalent to a second number from the second log record; and
adjusting the third number of the third log record proportionally to an amount of overlap between the interval of the second log record and a first interval of the set of one or more contiguous intervals.

7. The method of claim 6, further comprising:
identifying the plurality of third log records within the set of third log records that each have a same key, a same operation name, a same start timestamp, and a same end time stamp; and
generating the aggregated log record with the aggregated number that is a sum of numbers from the plurality of third log records.

8. A system comprising:
a memory coupled to a processor;
a monitoring service that executes on the processor, uses the memory, and is configured for:
receiving a set of first log records having a first log record comprising a plurality of events, wherein the first loci record includes a first format, wherein the first loci record includes multiple log key operation pairs, and wherein the plurality of events occurs during a first set of intervals and includes an event comprising a key and an operation name;
duplicating the set of first log records using key operation pairs to generate a set of second log records from the set of first log records, wherein the set of second log records includes a second log record that includes a single log key operation pair from the multiple log key operation pairs from the first log record;

duplicating the set of second log records using a second set of intervals to generate a set of third log records from the set of second log records, wherein a third log record of the set of third log records identifies a first interval of the first set of intervals and identifies a second interval of the second set of intervals;
aggregating the set of third log records using the second set of intervals to generate a set of aggregated log records, wherein the set of aggregated log records includes an aggregated log record comprising an aggregated number indicating a number of events from the set of first log records that have the key, that have the operation name, and that identifies the second interval of the second set of intervals;
generating the aggregated log record from a plurality of third log records, which are from the set of third log records; and
identifying the operation name by comparing the aggregated log record to a server log record.

9. The system of claim 8, wherein the first log records include a first log record that has a first alignment of log start times that is different from a second alignment of log start times of the aggregated log record.

10. The system of claim 8,
wherein the first format is serialized human-readable text,
wherein the first log record of the set of first log records identifies a first interval of the first set of intervals, and
wherein the second log record of the set of second log records identifies the first interval of the first set of intervals.

11. The system of claim 10,
wherein the first format is a JavaScript object notation (JSON) format, and
wherein the first log record includes a second format that includes a tabular form.

12. The system of claim 8, wherein the monitoring service is further configured for:
identifying a plurality of key operation pairs from the plurality of events of the first log record of the set of first log records; and
duplicating the first log record for each key operation pair of the plurality of key operation pairs.

13. The system of claim 12, wherein the monitoring service is further configured for:
identifying a set of one or more contiguous intervals that fully overlap the interval of a second log record of the set of second log records;
duplicating the second log record for each of the contiguous intervals of the set of one or more contiguous intervals to form a first group of third log records within the set of third log records that each have a third number equivalent to a second number from the second log record; and
adjusting the third number of the third log record proportionally to an amount of overlap between the interval of the second log record and a first interval of the set of one or more contiguous intervals.

14. The system of claim 13, wherein the monitoring service is further configured for:
identifying the plurality of third log records within the set of third log records that each have a same key, a same operation name, a same start timestamp, and a same end time stamp; and
generating the aggregated log record with the aggregated number that is a sum of numbers from the plurality of third log records.

15. A non-transitory computer readable medium comprising computer readable program code for:
- receiving a set of first log records having a first log record comprising a plurality of events, wherein the first loci record includes a first format, wherein the first log record includes multiple log key operation pairs, and wherein the plurality of events occurs during a first set of intervals and includes an event comprising a key and an operation name;
- duplicating the set of first log records using key operation pairs to generate a set of second log records from the set of first log records, wherein the set of second log records includes a second log record that includes a single log key operation pair from the multiple log key operation pairs from the first log record;
- duplicating the set of second log records using a second set of intervals to generate a set of third log records from the set of second log records, wherein a third log record of the set of third log records identifies a first interval of the first set of intervals and identifies a second interval of the second set of intervals;
- aggregating the set of third log records using the second set of intervals to generate a set of aggregated log records, wherein the set of aggregated log records includes an aggregated log record comprising an aggregated number indicating a number of events from the set of first log records that have the key, that have the operation name, and that identifies the second interval of the second set of intervals;
- generating the aggregated log record from a plurality of third log records, which are from the set of third log records; and
- identifying the operation name by comparing the aggregated log record to a server log record.

16. The non-transitory computer readable medium of claim 15, wherein the first log records include a first log record that has a first alignment of log start times that is different from a second alignment of log start times of the aggregated log record.

17. The non-transitory computer readable medium of claim 15,
- wherein the first format is serialized human-readable text,
- wherein the first log record of the set of first log records identifies a first interval of the first set of intervals, and
- wherein the second log record of the set of second log records identifies the first interval of the first set of intervals.

18. The non-transitory computer readable medium of claim 17,
- wherein the first format is a JavaScript object notation (JSON) format, and
- wherein the first log record includes a second format that includes a tabular form.

19. The non-transitory computer readable medium of claim 15, further comprising computer readable program code for:
- identifying a plurality of key operation pairs from the plurality of events of the first log record of the set of first log records; and
- duplicating the first log record for each key operation pair of the plurality of key operation pairs.

20. The non-transitory computer readable medium of claim 19, further comprising computer readable program code for:
- identifying a set of one or more contiguous intervals that fully overlap the interval of a second log record of the set of second log records;
- duplicating the second log record for each of the contiguous intervals of the set of one or more contiguous intervals to form a first group of third log records within the set of third log records that each have a third number equivalent to a second number from the second log record; and
- adjusting the third number of the third log record proportionally to an amount of overlap between the interval of the second log record and a first interval of the set of one or more contiguous intervals.

* * * * *